United States Patent
Yang et al.

(10) Patent No.: US 11,426,907 B2
(45) Date of Patent: Aug. 30, 2022

(54) MOLD ASSEMBLY FOR INJECTION MOLDING

(71) Applicant: LG Electronics Inc., Seoul (KR)

(72) Inventors: Joonsang Yang, Seoul (KR); Kyungdo Kim, Seoul (KR); Seokjae Jeong, Seoul (KR); Youngkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 16/073,055

(22) PCT Filed: Jan. 19, 2017

(86) PCT No.: PCT/KR2017/000654
§ 371 (c)(1),
(2) Date: Jul. 26, 2018

(87) PCT Pub. No.: WO2017/131386
PCT Pub. Date: Aug. 3, 2017

(65) Prior Publication Data
US 2019/0030770 A1 Jan. 31, 2019

(30) Foreign Application Priority Data
Jan. 26, 2016 (KR) .................. 10-2016-0009664

(51) Int. Cl.
*B29C 45/00* (2006.01)
*B29C 45/27* (2006.01)
(Continued)

(52) U.S. Cl.
CPC .......... *B29C 45/0025* (2013.01); *B29C 45/00* (2013.01); *B29C 45/0001* (2013.01);
(Continued)

(58) Field of Classification Search
None
See application file for complete search history.

(56) References Cited

U.S. PATENT DOCUMENTS

2005/0046060 A1* 3/2005 Nagaoka ................. B29C 45/28
264/40.1
2005/0238486 A1* 10/2005 Stagg .................... F04D 29/326
415/179
(Continued)

FOREIGN PATENT DOCUMENTS

JP 07227888 A * 8/1995 ......... B29C 45/0025
JP H10318263 12/1998
(Continued)

OTHER PUBLICATIONS

Kuehnert (Kuehnert, I., "Weld Lines in Injection Molded Parts: Strength, Morphology, and Improvement", Society of Plastic Engineers, ANTEC Indianapolis, pp. 1255-1259; 2016.) (Year: 2016).*
(Continued)

*Primary Examiner* — Matthew J Daniels
*Assistant Examiner* — Gregory Chad Grosso
(74) *Attorney, Agent, or Firm* — Fish & Richardson P.C.

(57) ABSTRACT

Disclosed is a mold assembly comprising: a cavity forming an inner space to be filled with resin containing metallic particles, and having a protruding part corresponding to a hole of a molded object; a first gate disposed at any one side of the cavity so as to inject the resin into the inner space; and a second gate disposed at another side of the cavity, and injecting the resin, which flows in a second direction intersecting with a first direction, into the inner space so as to change the arrangement of the metallic particles such that a weld line, formed according to the orientation of metallic particle in the first direction, is blurred in an area at which the flow of the resin is separated by the protruding part and then comes back together.

12 Claims, 5 Drawing Sheets

(51) Int. Cl.
  *B29C 45/26* (2006.01)
  *B29C 45/76* (2006.01)
  *B29K 505/00* (2006.01)

(52) U.S. Cl.
  CPC .......... *B29C 45/0013* (2013.01); *B29C 45/26* (2013.01); *B29C 45/27* (2013.01); *B29C 45/76* (2013.01); *B29C 2045/0027* (2013.01); *B29C 2045/0032* (2013.01); *B29K 2505/00* (2013.01)

(56) References Cited

U.S. PATENT DOCUMENTS

| | | | | |
|---|---|---|---|---|
| 2011/0248426 | A1* | 10/2011 | Fukushima | B29C 45/0046 264/328.1 |
| 2012/0269916 | A1* | 10/2012 | Kikuchi | B29C 45/0025 425/130 |
| 2013/0069279 | A1* | 3/2013 | Busch | B29C 45/0046 264/319 |

FOREIGN PATENT DOCUMENTS

| | | |
|---|---|---|
| JP | 2002192575 A | 7/2002 |
| JP | 2004223980 A | 8/2004 |
| JP | 2011156758 | 8/2011 |
| JP | 2011218674 A | 11/2011 |
| JP | 2013204120 A | 10/2013 |
| JP | 2013204122 A | 10/2013 |
| JP | 2015131466 | 7/2015 |

OTHER PUBLICATIONS

Shin (Shin, S., Process Dynamics of Sequential Valve Gate Injection Molding (Processing Strategy and Control); University of Massachusetts Lowell, 2000.) (Year: 2000).*

Sumiya Yositeru et al., JP2015131466(A) English transcription, Jul. 23, 2015, pertinent pp. 12-16 (and Fig. 6). (Year: 2015).*

Office Action in Korean Appln. No. 10-2016-0009664, dated Sep. 1, 2021, 16 pages (with English translation).

Office Action in Korean Appln. No. 10-2016-0009664, dated Mar. 24, 2022, 15 pages (with English translation).

* cited by examiner

MOLD ASSEMBLY FOR INJECTION MOLDING

CROSS-REFERENCE TO RELATED APPLICATIONS

This application is a National Stage application under 35 U.S.C. § 371 of International Application No. PCT/KR2017/000654, filed on Jan. 19, 2017, which claims the benefit of Korean Application No. 10-2016-0009664, filed on Jan. 26, 2016. The disclosures of the prior applications are incorporated by reference in their entirety.

BACKGROUND OF THE INVENTION

1. Field of the Invention

The present invention relates to a mold assembly for injection molding of a molded object having a hole.

2. Description of the Related Art

Figure 1A:
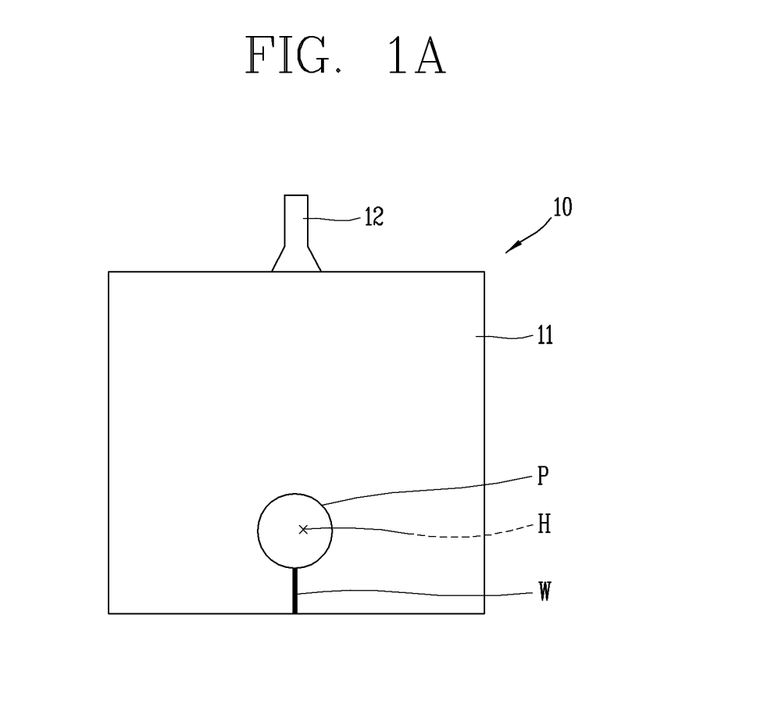
FIG. 1A is a conceptual view illustrates a general mold assembly for injection molding according to the related art.
Figure 1B:
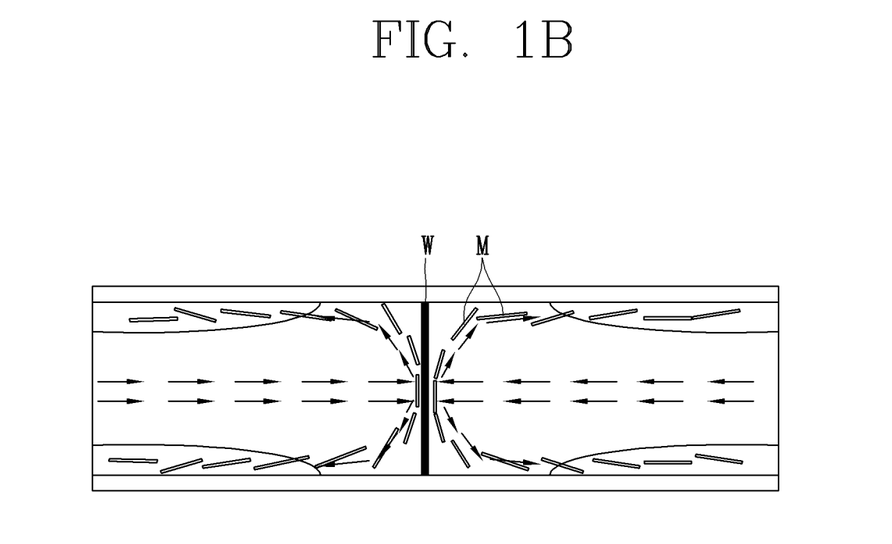
FIG. 1B is a conceptual view illustrates resin flows in a weld line region illustrated in FIG. 1A.

FIG. 1A is a conceptual view of a typical mold assembly 10 for injection molding according to the related art, and FIG. 1B is a conceptual view illustrating a resin flow in a weld line region illustrated in FIG. 1A.

As illustrated in FIGS. 1A and 1B, a mold assembly 10 for injection molding generally includes a cavity 11 formed to correspond to an outer appearance of a molded object, and a molten resin is injected into the cavity 11, solidified and then taken out.

On the other hand, to form an attractive outer appearance of the molded object, a method of spraying a spray solution containing particles of silver or the like having high brightness to a general molded object made of a typical resin to treat a surface of the molded object. However, a post-processing method using the spray solution increases a fabricating cost due to difficulty in masking, defects, and handling, and is harmful to a human body due to a use of volatile organic compounds. Recently, a so-called metallic injection molding method has been used in which metallic pigments M are directly added to a resin and injected in order to omit the surface treatment process using the spray solution.

However, when a molded object in a shape of a hole H is fabricated by such a metallic injection molding method, a weld line W is formed on an outer surface of the molded object due to the hole H. Specifically, when the resin containing the metallic pigments M is injected into the cavity 11 having a protrusion (or protruding part) P corresponding to the hole H through a gate 12, a flow front of the resin is divided into two parts due to the protruding part P and the divided two parts meet each other so as to form the weld line W.

The weld line W appears more prominently on the appearance of the molded object during the metallic injection as compared to the general injection molding method. This is because the metal pigments M are generally in the form of a plate, and, as illustrated in FIG. 1B, side portions of the metallic pigments M are perpendicularly oriented when viewed from the outer appearance of the molded object in a region where the divided parts of the flow front of the resin meet each other again.

The portions of the metallic pigments which are perpendicularly aligned in the region of the weld line W have smaller regions reflecting external light than those of the other portions horizontally aligned when viewed from the outer appearance of the molded object, and thus look like the weld line on the outer appearance of the molded object, which deteriorates quality of the outer appearance of the completely-fabricated molded object.

SUMMARY OF THE INVENTION

One aspect of the present invention is to provide a mold assembly in which a weld line appearing on a molded object having a hole can be blurred at the time of injection molding (metallic mold), particularly, metallic molding using a resin containing metallic pigments.

Another aspect of the present invention is to provide a mold assembly in which a plurality of weld lines appearing on a molded object can be blurred even when fabricating the molded object having a plurality of holes more than two in an injection molding manner.

According to an aspect of the present invention, there is provided a mold assembly, including a cavity forming an inner space to be filled with a resin containing metallic pigments and provided with a protrusion corresponding to a hole of a molded object, a first gate disposed at one side of the cavity to inject the resin into the inner space, and a second gate disposed at another side of the cavity and configured to change an arrangement of the metallic pigments by injecting the resin flowing in a second direction intersecting with a first direction, so as to blur a weld line formed as the metallic pigments are aligned in the first direction in a region where flows of the resin divided by the protrusion meet again.

The mold assembly may further include an overflow accommodating unit configured to accommodate the resin excessively filled in the inner space and communicate with the inner space at a time point of opening or closing the second gate.

The mold assembly may further include an opening/closing unit configured to open and close a flow path formed between the overflow accommodating unit and the inner space at a time point of opening or closing the second gate.

A flow path communicating between the overflow accommodating unit and the inner space may be disposed at a position where a front of the flow of the resin can be introduced into the overflow accommodating unit along the weld line.

The flow path communicating between the overflow accommodating unit and the inner space may be formed at a position in contact with the weld line.

The mold assembly may further include a control unit to control the second gate so that the resin is injected into the inner space between preset times before and after a time point when the weld line is formed by the resin.

The second gate may inject the resin into the inner space such that a front of the flow of the resin forms an angle with the weld line in the range of 30 degrees to 150 degrees.

The protrusion may include first and second protrusions, and the second gate may include a first injection port to inject the resin into the inner space to blur a first weld line formed by the first protrusion, and a second injection port to inject the resin into the inner space to blur a second weld line formed by the second projection.

The second injection port may be opened after a predetermined time has elapsed since the first injection port is opened, such that the resin is injected into the inner space.

The mold assembly may further include an overflow accommodating unit to accommodate the resin excessively filled in the inner space and configured to communicate with the inner space at a time point of opening or closing the second injection port.

According to another aspect of the present invention, there is provided a mold assembly, including a cavity forming an inner space to be filled with a resin containing metallic pigments and provided with a protrusion corresponding to a hole of a molded object, a first gate disposed at one side of the cavity to inject the resin into the inner space, and a second gate disposed at another side of the cavity, and configured to inject the resin in a direction intersecting with a flow of the resin injected into the inner space through the first gate, the second gate injecting the resin to an opposite side of the first gate with respect to the protrusion.

The mold assembly may further include an overflow accommodating unit configured to accommodate the resin excessively filled in the inner space and communicate with the inner space at a time point of opening or closing the second gate.

According to the present invention, a second gate may be configured to inject a resin, which flows in a direction intersecting with a flowing direction of a resin injected into an inner space of a cavity through a first gate, into the inner space of the cavity. Therefore, the resin injected into the inner space through the second gate may cause a change in the flow of the resin in a region of a protrusion formed in the cavity, which may result in blurring a weld line appearing in the protrusion region, thereby further improving appearance quality of a molded object.

The present invention may further include an overflow accommodating unit communicating with the inner space of the cavity at a time point of opening and closing the second gate. Accordingly, the flow of the resin injected into the inner space through the second gate can be made sufficiently for a period of time that the weld line can be blurred.

A flow path for communicating the overflow accommodating unit and the inner space may be disposed at a position where a front of the flow of the resin injected through the second gate can be introduced into the overflow accommodating unit along the weld line. Thus, the flow of the resin injected into the inner space through the second gate can effectively act to change the flow of the resin in the weld line region.

In addition, according to the present invention, the second gate, which brings about a secondary flow for blurring the weld line into the inner space of the cavity during injection molding of a molded object having a plurality of holes, may be divided into a first injection port and a second injection port, so as to change a plurality of weld lines appearing on the molded object to be blurred through the first and second injection ports. Therefore, the appearance quality of the completed-fabricated molded product can be further improved even when performing the injection molding to fabricate the molded product having the plurality of holes.

DETAILED DESCRIPTION OF THE INVENTION

Hereinafter, a clothes treating apparatus according to the present invention will be described in detail with reference to the accompanying drawings.

A singular representation may include a plural representation unless it represents a definitely different meaning from the context.

The same or equivalent components may be provided with the same or similar reference numbers, even in different embodiments, and description thereof will not be repeated.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 2:
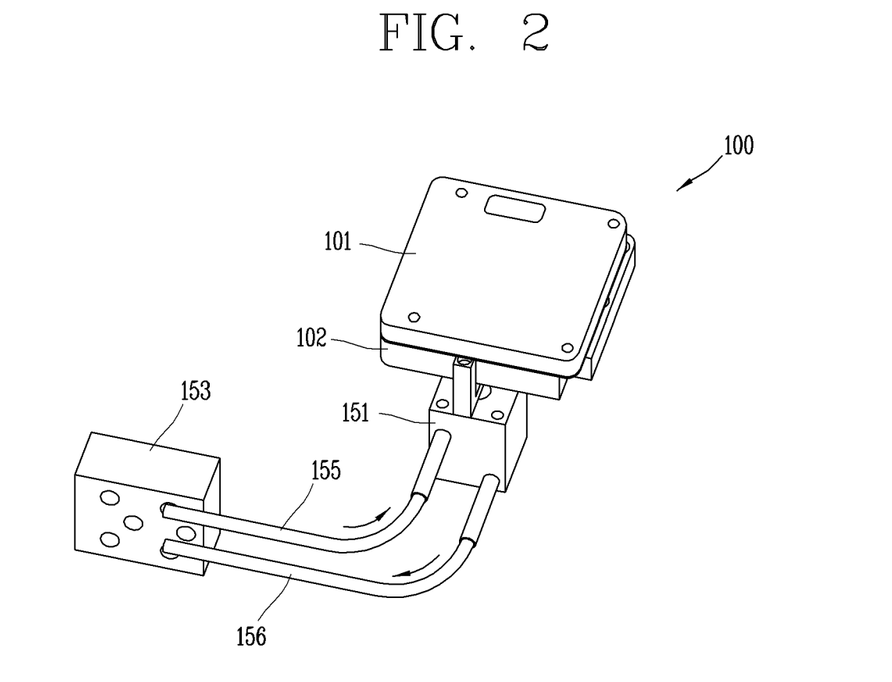
FIG. 2 is a perspective view of a mold assembly in accordance with one embodiment of the present invention.
Figure 3:
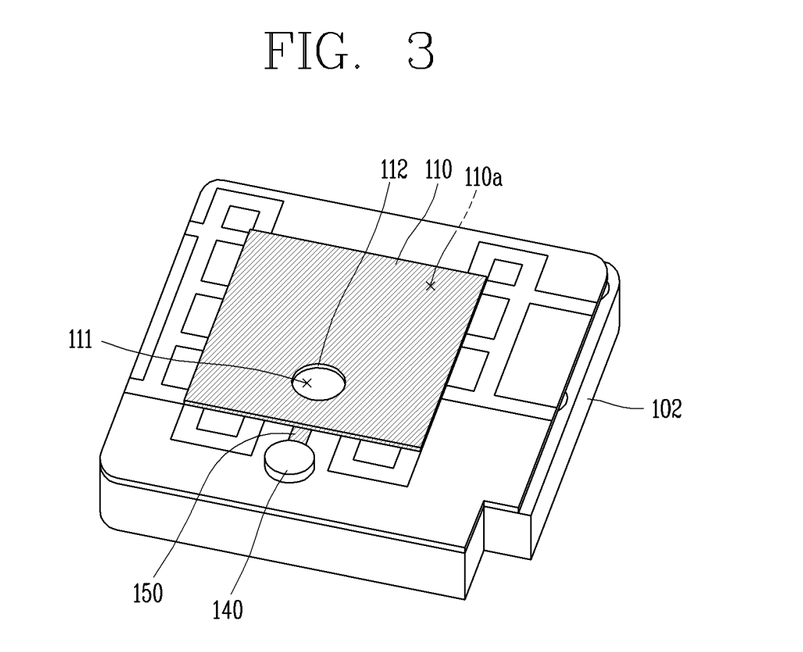
FIG. 3 is a perspective view illustrating a cavity formed between first and second templates illustrated in FIG. 2.

FIG. 2 is a perspective view illustrating a mold assembly 100 according to one embodiment of the present invention, and FIG. 3 is a perspective view illustrating a cavity 110 formed between first and second templates 101 and 102 illustrated in FIG. 2.

Referring to FIGS. 2 and 3, the mold assembly 100 is a device for injecting a resin into a template fabricated in a shape of a molded object, solidifying the resin and producing the molded object. To this end, the mold assembly 100 includes a cavity 110 corresponding to the shape of the molded object.

The cavity 110 forms an inner space 110a to be filled with a resin containing metallic pigments (or metallic particles), and is provided with a protrusion (or protruding part) 112 corresponding to a hole 111 provided in the molded object. The inner space 110a is formed to correspond to the shape of the molded object. The cavity 110 may be formed in a manner of coupling a first template 101 and the second template 102 to each other.

For example, the metal pigments may be formed of powdered silver exhibiting high brightness, and have a shape of a plate that upper and lower surfaces are wider than side surfaces.

Meanwhile, an overflow accommodating unit 140, an opening/closing unit 150, a cylinder 151, a driving unit 153, and first and second connecting pipes 155 and 156 illustrated in FIGS. 2 and 3 will be described later.

Hereinafter, description will be given of a mechanism for improving appearance of a molded object by blurring weld lines exposed to the outside of the molded object when the molded object having the hole 111 is fabricated in the injection molding manner.

Figure 4:
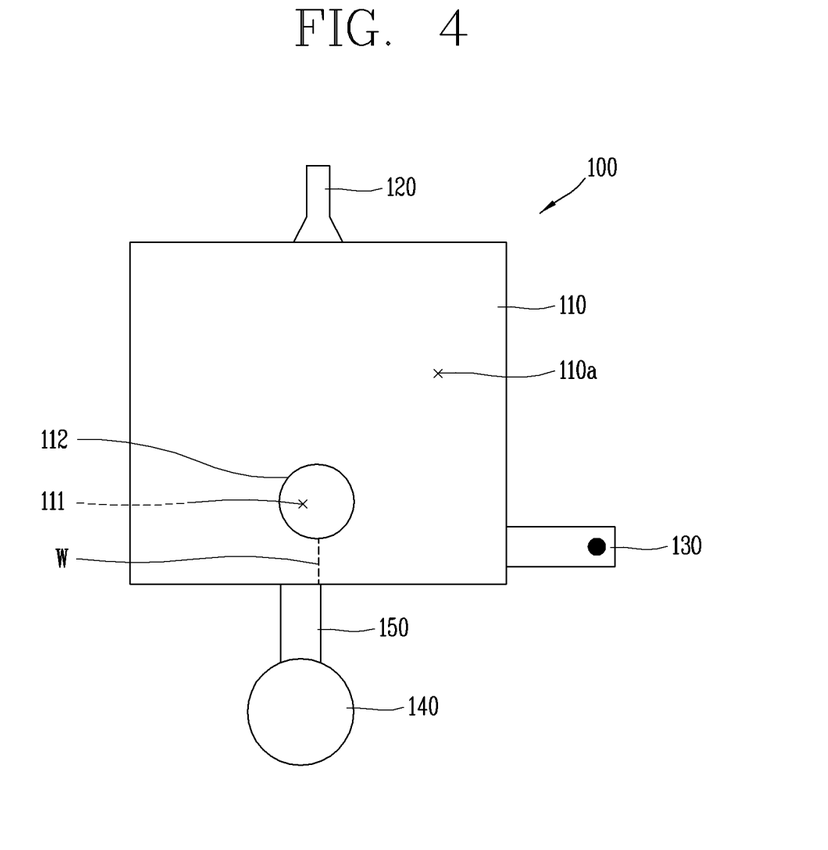
FIG. 4 is a conceptual view of a mold assembly illustrated in FIG. 2.
Figure 5A:
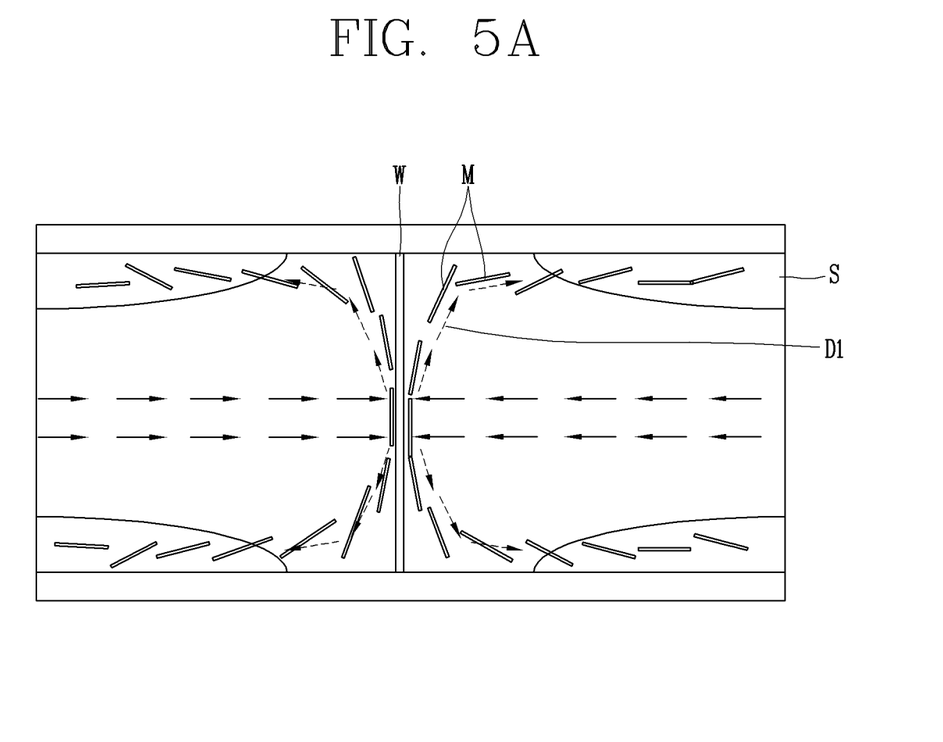
FIG. 5A is a conceptual view illustrating a flow of a first resin in a weld line region illustrated in FIG. 4.

FIG. 4 is a conceptual view illustrating the mold assembly 100 illustrated in FIG. 2. FIG. 5A is a conceptual view illustrating a flow of a first resin in a region of a weld line W (weld line region) illustrated in FIG. 4, and FIG. 5B is a conceptual view illustrating a flow of a second resin in the weld line region illustrated in FIG. 4.

Figure 5B:
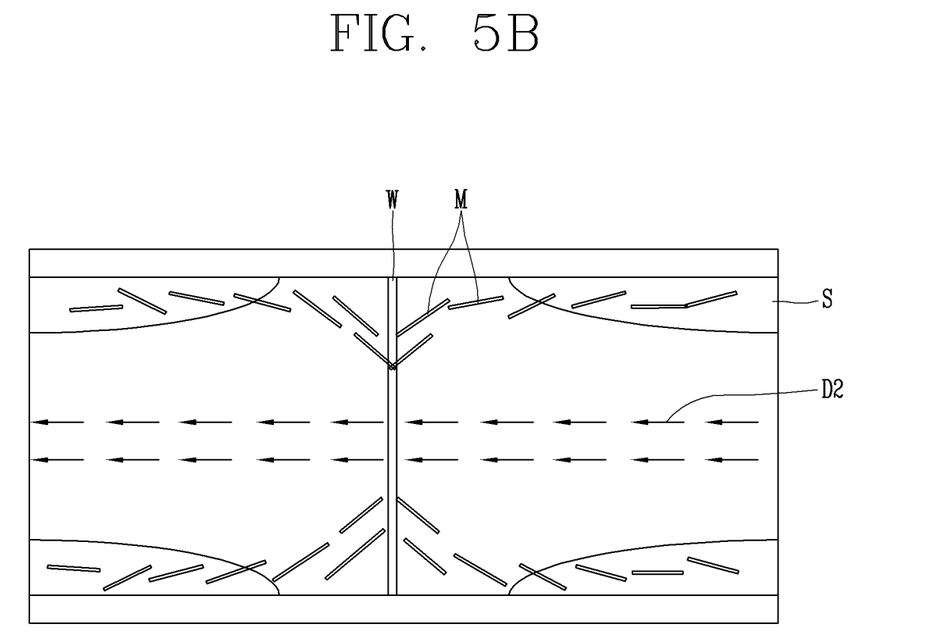
FIG. 5B is a conceptual view illustrating a flow of a second region in the weld line region illustrated in FIG. 4.

Referring to FIGS. 4 to 5B, the mold assembly 100 includes the cavity 110, a first gate 120 and a second gate 130.

The first gate 120 is disposed at one side of the cavity 110 and is configured to inject a resin containing metallic pigments (or metallic particles) M into the inner space 110a of the cavity 110. The resin injected into the inner space 110a is filled with making a predetermined flow in the inner space 110a and solidified to form a solidification layer S according to a lapse of time, as illustrated in FIG. 5A. At this time, the metallic pigments M contained in the resin are fixed in the solidification layer S.

The second gate 130 is configured to inject the resin in a direction, which intersects with the flow of the resin injected into the inner space 110a through the first gate 120, by the protrusion 112 formed in the cavity 110. Here, the second gate 130 is configured to inject the resin to an opposite side of the first gate 120 with respect to the protrusion 112.

More specifically, the flow of the resin injected from the first gate 120 into the inner space 110a is divided into two flow front ends while encountering the protrusion 112 of the cavity 1100. Afterwards, as illustrated in FIG. 5A, in a region where the protrusion 112 ends, namely, a region where the resin flows collide with each other by being rejoined after being divided by the protrusion 112, the metallic pigments M are aligned in a first direction D1 to form a weld line W.

The weld line W refers to a line similar to a weld line appearing on the appearance of the molded object after completion of the injection molding. Further, the weld line W appears more prominently on the appearance of the molded object when the resin containing the metallic pigments M is injected and molded. The reason for this is that the metallic pigments each formed in the plate shape are aligned in a manner that side portions thereof are perpendicularly arranged to face the outside by the flow of the resin in the region where the weld line W is formed. The metallic pigments W perpendicularly arranged in this manner are solidified according to the lapse of time. The metallic pigments perpendicularly arranged in the weld line region have a relatively narrow area reflecting external light, thereby forming the weld line W on the outer surface of the completely-fabricated molded object.

On the other hand, in a region other than the weld line W region in the inner space 110a, relatively large upper and lower surfaces other than the side portions of the metallic pigments M are horizontally arranged to face the outside. The horizontally-arranged metallic pigments M have a large area reflecting external light, thereby realizing a molded object having an appearance with high brightness.

Here, the second gate 130 is disposed on another side of the cavity 110 in order to blur the weld line W. As illustrated in FIG. 5b, the resin, which causes a new flow in a second direction D2 intersecting with the direction, namely, a first direction D1 in which the metallic pigments M are perpendicularly aligned in the weld line region by the flow of the resin injected through the first gate 120, is injected into the inner space 110a of the cavity 110 through the second gate 130, thereby changing the arrangement of the metallic pigments M arranged in the first direction D1.

The second gate 130 is configured to inject the resin in the second direction D2. Here, the second gate 130 is configured to inject the resin into the inner space 110a of the cavity 110 in a manner that a flow front end of the resin forms an angle with the weld line W in the range of 30 to 150 degrees. The flow front end of the resin discharged from the second gate 130 may preferably be perpendicular to the weld line W to change the arrangement of the metallic pigments M which are generally arranged perpendicularly. However, it may be effectively applied even to a case where the flow front end of the resin forms an angle of 30 degrees or more or 150 degrees or less with the weld line W.

Further, the mold assembly 100 may further include a control unit (not illustrated) for controlling an operation of the second gate 130.

The control unit controls a time point, at which the resin is injected through the second gate 130 to cause the flow of resin for blurring the weld line W, between preset times before and after a time point at which the weld line W is formed. For example, the control unit may control the second gate 130 to discharge the resin into the inner space 110a for a period of time between one second before the time point at which the weld line W is formed and one second after the time point. As described above, the time point at which the resin is injected through the second gate 130 may be effectively applied even to the time point before after the time point of forming the weld line W as well as the time point of forming the weld line W.

For reference, the time point at which the weld line W is formed may be set through a pre-simulation process in which the flow of the resin is observed for each unit time after the resin is spouted out through the first gate 120.

According to the present invention described above, the second gate 130 is configured to inject into the inner space the resin which makes the flow in the direction intersecting with the flowing direction of the resin injected into the inner space 110a of the cavity 110 through the first gate 120. The resin injected into the cavity 110 through the second gate 130 causes the change in the flow of the resin in the region of the protrusion 112 formed in the cavity 110. As a result, the weld line W appearing in the region of the protrusion 112 of the cavity 110 is blurred, thereby further improving appearance quality of the completely-fabricated molded object.

Meanwhile, the mold assembly 100 may further include an overflow accommodating unit 140.

The overflow accommodating unit 140 is formed to accommodate (store) the resin excessively filled in the inner space 110a of the cavity 110. The overflow accommodating unit 140 is configured to communicate with the inner space 110a at the moment when the second gate 130 is opened and closed. Specifically, the second gate 130 is configured to discharge the resin after a predetermined time elapses from the start of the discharge of the resin through the first gate 120. At this time, at the time point when the resin is spouted out through the second gate 130, a considerable part of the inner space 110a is already filled with the resin and thereby a space, in which the resin spouted out through the second gate 130 is to be filled is insufficient. In this case, no flow is made to the weld line W by the supply of the resin through the second gate 130, and thereby the arrangement of the metallic pigments M in the weld line region cannot be changed.

Accordingly, the present invention provides the overflow accommodating unit 140 configured to communicate with the inner space 110a at the time point of opening and closing of the second gate 130, such that the flow of the resin spouted out through the second gate 130 can be made in the inner space 110a sufficiently for a time for which the weld line can be changed to be faint.

A flow path communicating between the overflow accommodating unit 140 and the inner space 110a of the cavity 110 is formed at a position at which the flow front end of the resin generated in the second gate 130 can be introduced into the overflow accommodating unit 140 along the weld line W.

Specifically, most of the inner space 110a is filled with the resin at the time point when the second gate 130 is opened. At this time, the flow of the resin injected into the inner space through the second gate 130 is made along a flow path which starts from an outlet of the second gate 130 and communicates a considerable portion of the overflow accommodating unit 140 with the inner space of the cavity 110. The flow path communicating between the overflow accommodating unit 140 and the inner space 110a of the cavity 110 is formed at a position where the front of the flow of the resin generated in the second gate 130 passes along the weld line W and then is introduced into the overflow accommodating unit 140, for example, at an opposite side of the second gate 130 with respect to the weld line W.

Accordingly, the resin spouted through the second gate 130 is made to flow into the overflow accommodating unit 140 after changing the arrangement of the metallic pigments M in the weld line W. As a result, the resin spouted out through the second gate 130 flows into the overflow accommodating unit 140 after changing the arrangement of the metallic pigments M at the weld line W.

The flow path communicating between the overflow accommodating unit 140 and the inner space 110a of the cavity 110 may be formed at a position in contact with the weld line W. More specifically, the resin injected through the first gate 120 is solidified into a solid state in predetermined regions of the inner space 110a of the cavity 110. On the other hand, the resin is not completely solidified in the region without the weld line W. Thus, the flow of the resin can continue for a predetermined time.

The flow path communicating between the overflow accommodating unit 140 and the inner space 110a of the cavity 110, as illustrated, is formed at the position brought into contact with the weld line W, which may further enhance reliability of the mechanism of changing the arrangement of the metallic pigments M of the weld line W by virtue of the flow of the resin injected through the second gate 130.

Meanwhile, the mold assembly 100 may further include an opening/closing unit 150.

The opening/closing unit 150 is configured to open and close the flow path formed between the overflow accommodating unit 140 and the inner space 110a. Specifically, the opening/closing unit 150 is disposed on the flow path that communicates between the overflow accommodating unit 140 and the inner space 110a of the cavity 110, and opens and closes the flow path of the resin introduced into the overflow accommodating unit 140 from the inner space 110a in correspondence with an opening/closing time point of the second gate 130 or the time point of forming the weld line W.

Also, referring to FIG. 2, the opening/closing unit 150 may include a cylinder 151, a driving unit 153, first and second connecting pipes 155 and 156, to selectively open and close the flow path of the resin introduced into the overflow accommodating unit 140.

The cylinder 151 may receive a driving force to raise or lower the opening/closing unit 150, thereby opening or closing the flow path of the resin introduced into the overflow accommodating unit 140.

The driving unit 153 may be configured to supply the driving force to the cylinder 151 for operation. For example, the driving unit 153 may raise the opening/closing unit 150 by supplying hydraulic pressure or pneumatic pressure to the cylinder 151 or lower the opening/closing unit 150 by recovering the hydraulic or pneumatic pressure supplied to the cylinder 151.

To this end, the first and second connecting pipes 155 and 156 may be disposed between the cylinder 151 and the driving unit 153 to provide a path along which the hydraulic or pneumatic pressure is transferred. For example, the first connecting pipe 155 may provide a path for supplying the hydraulic or pneumatic pressure from the driving unit 153 to the cylinder 151, and the second connecting pipe 156 may provide a path for recovering the hydraulic or pneumatic pressure from the cylinder 151 to the driving unit 153.

Figure 6:
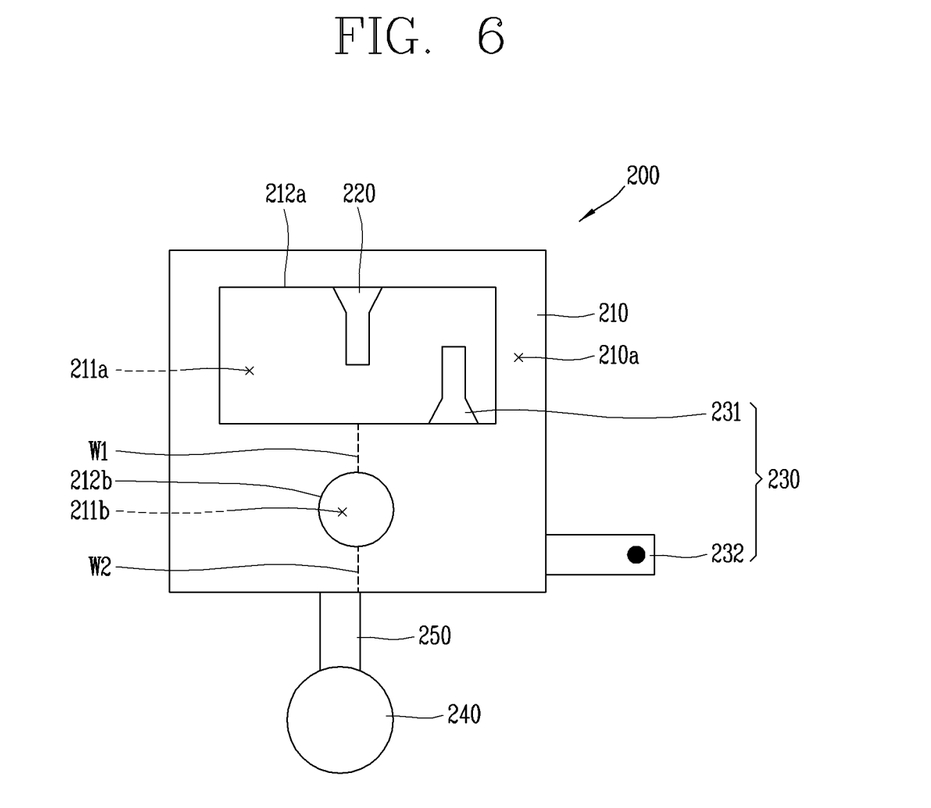
FIG. 6 is a conceptual view illustrating another embodiment of the mold assembly illustrated in FIG. 2.

Hereinafter, a mold assembly 200 for injection molding of a molded object having a plurality of holes 211a and 211b will be described.

FIG. 6 is a conceptual view illustrating another embodiment of a mold assembly 200 illustrated in FIG. 2.

Referring to FIG. 6, the mold assembly 200 includes a cavity 210, a first gate 220, a second gate 230, an overflow accommodating unit 240, and an opening/closing unit 250. The cavity 210, the first gate 220, the second gate 230, the overflow accommodating unit 240, and the opening/closing unit 250 may be configured to have similar features to those of the first gate 120, the second gate 130, the overflow accommodating unit 140, and the opening/closing unit 250 of the mold assembly 100 illustrated with reference to FIGS. 2 to 5B, in the aspects of structures and effects.

The mold assembly 200 is a device for injection molding of a molded object having a plurality of holes 211a and 211b. Herein, a case where two holes 211a and 211b are formed is described as an example.

The cavity 210 includes a first protrusion (or protruding part) 212a and a second protrusion 212b corresponding to the first and second holes 211a and 211b, respectively.

The second gate 230 includes a first injection port 231 and a second injection port 232.

The first injection port 231 is configured to inject the resin into an inner space 210a of the cavity 210 so as to blur a first weld line W1 formed on the molded object by the first projection 212a.

The second injection port 232 is configured to inject the resin into the inner space 210a of the cavity 210 so as to blur a second weld line W2 formed by the second projection 212b.

The second injection port 232 may be opened after a predetermined time has elapsed since the first injection port 231 is opened to inject the resin into the inner space 210a of the cavity 210. That is, the first injection port 231 and the second injection port 232 are configured to cause a flow of resin in the inner space 210a with a time difference to correspond to time points when the first and second weld lines W1 and W2 are formed. This may prevent possibility that the flows of the resin spouted through the first injection port 231 and the second injection port 232 unintentionally affect each other so as to cause unnecessary influence on blurring of the weld lines W1 and W2.

In addition, the mold assembly 200 may further include an overflow accommodating unit 240.

The overflow accommodating unit 240 is configured to accommodate the resin excessively filled in the inner space 210a of the cavity 210. The overflow accommodating unit 240 is configured to communicate with the inner space 210a at the time point of opening or closing the second injection port 232. Here, the first injection port 231 may be opened at the time point when the first weld line W1 is formed, so as to spout the resin in a state where a considerable portion of the inner space 210a remains unfilled with the resin. This may allow the first weld line W1 to be blurred even without a separate overflow region such as the overflow accommodating unit 240.

However, in this case, the first injection port 231 is preferably disposed in the vicinity of the first weld line W1 region where solidification of the resin relatively proceeds later. According to the structure of the mold assembly 200, it is not necessary to provide a separate overflow region corresponding to the first injection port 231 in order to make the first weld line W1 faint. Therefore, the mold assembly 200 having more simplified configuration can be implemented.

What is claimed is:

1. A mold assembly, comprising:
a cavity that defines an inner space configured to receive a resin comprising metallic pigments;
a protrusion disposed in the cavity and configured to define a hole of a molded object;
a first gate disposed at a first side of the cavity and configured to inject the resin into the inner space in a first direction to thereby define a weld line based on the metallic pigments being aligned in the first direction in a region where flows of the resin injected through the first gate meet together after being divided by the protrusion;
a second gate disposed at a second side of the cavity and configured to inject the resin into the inner space in at least a second direction intersecting the first direction;
a control unit configured to control injection of the resin through the second gate in the second direction toward the weld line to move the metallic pigments from at least a portion of the region where the weld line is defined;
an overflow accommodating space configured to accommodate the resin flowing out of the inner space and to communicate with the inner space at a time point of opening or closing the second gate; and
a flow path that is configured to communicate between the overflow accommodating space and the inner space of the cavity, the flow path being defined at a position away from the second gate relative to the weld line such that a flow front end of the resin injected through the second gate is introduced into the overflow accommodating space after passing the weld line,
wherein the control unit is configured to:
control the second gate to inject the resin between preset times before and after a time point at which the weld line is defined by injecting the resin through the first gate, and
change orientations of the metallic pigments by injecting the resin in the second direction toward the weld line through the second gate while the resin is injected through the first gate in the first direction,
wherein the protrusion includes first and second protrusions, and
wherein the second gate comprises:
a first injection port configured to inject the resin into the inner space in a direction different from the second direction to move the metallic pigments from an area where a first weld line is defined by flow of the resin around the first protrusion, and
a second injection port configured to inject the resin into the inner space in the second direction to move the metallic pigments from an area where a second weld line is defined by flow of the resin around the second protrusion.

2. The assembly of claim 1, further comprising an opening/closing unit configured to open and close the flow path formed between the overflow accommodating space and the inner space at a time point of opening or closing the second gate.

3. The assembly of claim 1, wherein the flow path is configured to guide the flow front end of the resin into the overflow accommodating space along the weld line.

4. The assembly of claim 1, wherein at least a portion of the flow path is formed at a position in contact with the weld line.

5. The assembly of claim 1, wherein the control unit is configured to control the second gate to inject the resin into the inner space such that a front of flow of the resin injected through the second gate defines an angle with respect to the weld line in a range of 30 degrees to 150 degrees.

6. The assembly of claim 1, wherein the control unit is configured to control the second injection port to be opened after a predetermined time has elapsed since the first injection port is opened, such that the resin is injected into the inner space.

7. The assembly of claim 1, wherein the control unit is configured to:
control the second gate to inject the resin for a first preset period of time before the time point at which the weld line is formed by the resin injected through the first gate; and
control the second gate to inject the resin for a second preset period of time after the time point at which the weld line is formed by the resin injected through the first gate.

8. The assembly of claim 7, wherein the second preset period is equal to the first preset period.

9. The assembly of claim 1, wherein the time point at which the weld line is formed is determined by a pre-simulation process.

10. The assembly of claim 1, wherein the second gate and at least a portion of the overflow accommodating space are disposed at opposite sides with respect to the weld line.

11. The assembly of claim 1, wherein the second gate and a first portion of the overflow accommodating space are disposed at a first side with respect to the weld line, and
wherein a second portion of the overflow accommodating space is disposed at a second side opposite to the first side with respect to the weld line.

12. The assembly of claim 11, wherein an area of the second portion of the overflow accommodating space is greater than an area of the first portion of the overflow accommodating space.

* * * * *